(12) United States Patent
Suzuki

(10) Patent No.: US 11,982,258 B2
(45) Date of Patent: May 14, 2024

(54) VERTICAL-SHAFT WIND TURBINE

(71) Applicant: GLOBAL ENERGY CO., LTD., Shizuoka (JP)

(72) Inventor: Masahiko Suzuki, Shizuoka (JP)

(73) Assignee: GLOBAL ENERGY CO., LTD., Shizuoka (JP)

( * ) Notice: Subject to any disclaimer, the term of this patent is extended or adjusted under 35 U.S.C. 154(b) by 0 days.

(21) Appl. No.: 18/039,274

(22) PCT Filed: Dec. 2, 2021

(86) PCT No.: PCT/JP2021/044277
§ 371 (c)(1),
(2) Date: May 29, 2023

(87) PCT Pub. No.: WO2022/124193
PCT Pub. Date: Jun. 16, 2022

(65) Prior Publication Data
US 2024/0003330 A1  Jan. 4, 2024

(30) Foreign Application Priority Data
Dec. 9, 2020 (JP) .................. 2020-204489

(51) Int. Cl.
*F03D 3/00* (2006.01)
*F03D 3/02* (2006.01)
(Continued)

(52) U.S. Cl.
CPC ............... *F03D 3/011* (2023.08); *F03D 3/02* (2013.01); *F03D 9/25* (2016.05); *F03D 15/20* (2016.05);
(Continued)

(58) Field of Classification Search
CPC .... F03D 3/005; F03D 3/011; F05B 2240/212; F05B 2240/372
See application file for complete search history.

(56) References Cited

U.S. PATENT DOCUMENTS

| | | | |
|---|---|---|---|
| 2005/0244271 A1* | 11/2005 | Kinpara | ............. F03D 13/20 416/132 B |
| 2006/0251505 A1* | 11/2006 | Ferguson | ............. F03D 13/20 415/4.1 |

(Continued)

FOREIGN PATENT DOCUMENTS

| | | |
|---|---|---|
| JP | 62196424 A | 8/1987 |
| JP | 2006118384 | 5/2006 |

(Continued)

OTHER PUBLICATIONS

International Search Report for PCT/JP2021/044277, dated Jan. 11, 2022, Total of 2 pages.

(Continued)

*Primary Examiner* — Brian O Peters
(74) *Attorney, Agent, or Firm* — Apex Juris, pllc; Hilde M. L. Coeckx

(57) ABSTRACT

A generator is horizontally arranged in each plane central portion of horizontal frame bodies of a support frame body which is framed with the upper and lower horizontal frame bodies and a plurality of support poles, and a vertical main shaft of a vertical shaft rotor is integrally connected and supported between rotation shafts vertically facing each other of the upper and lower generators without using bearings to cooperatively move.

4 Claims, 7 Drawing Sheets

(51) Int. Cl.
*F03D 9/25* (2016.01)
*F03D 15/20* (2016.01)

(52) U.S. Cl.
CPC . *F05B 2220/7066* (2013.01); *F05B 2240/212* (2013.01); *F05B 2240/372* (2020.08); *F05B 2240/60* (2013.01); *F05B 2260/30* (2013.01)

(56) References Cited

U.S. PATENT DOCUMENTS

2012/0126542 A1* 5/2012 Deng .................... H02K 19/38
290/55
2021/0246869 A1* 8/2021 Suzuki .................... F03D 3/005

FOREIGN PATENT DOCUMENTS

JP 2011179497 A 9/2011
JP 2017066878 A 4/2017

OTHER PUBLICATIONS

Translation of abstract of JP2006118384, total of 1 page.
Translation of abstract of JP2017066878, total of 2 pages.
Translation of abstract of JP62196424, Total of 1 page.

* cited by examiner

VERTICAL-SHAFT WIND TURBINE

CROSS-REFERENCE TO RELATED APPLICATIONS

This application is a U.S. National Phase of International Application No. PCT/JP2021/044277, filed on Dec. 2, 2021, which claims priority from Japanese patent application No. 2020-204489, filed on Dec. 9, 2020. The entire contents of each of the above-listed applications are hereby incorporated by reference for all purposes.

TECHNICAL FIELD

The present disclosure relates to a vertical-shaft wind turbine, and particularly relates to a vertical-shaft wind turbine including a vertical shaft rotor supported by a vertical main shaft of which upper and lower end portions are respectively coupled with rotation shafts of upper and lower generators without using bearings, the generators being respectively arranged in upper and lower horizontal frame bodies of a support frame body for supporting the vertical shaft rotor, such that the vertical main shaft is vertically aligned and moves cooperatively to reduce torsion.

DESCRIPTION OF RELATED ART

Generally, as described in JP 2006-118384 A for example, a vertical main shaft of a vertical-shaft wind turbine is vertically provided on a generator, and upper and lower and/or intermediate portions of the vertical main shaft are supported by each bearing.

In the invention described in JP 2006-118384 A, since the upper and lower portions of the vertical main shaft are supported by each of the bearings, even though a rotation shaft of the generator and the vertical main shaft of the wind turbine are vertically supported, a deviation is generated. Therefore, the generator is loaded when the wind turbine rotates and accelerates, and torsion is generated on the vertical main shaft, thereby sometimes generating vibration and noise caused by the vibration.

SUMMARY

In view of the above disadvantages of the conventional techniques, the following technical means are taken according to the disclosure.

A vertical-shaft wind turbine including a plurality of lift-type vertical blades arranged at fixed intervals around a vertical main shaft of a vertical shaft rotor, wherein each of the lift-type vertical blades has a substantially vertical main portion and upper and lower inward circular arc-shaped portions that are respectively and continuously formed from a top and a bottom of the substantially vertical main portion to respectively elongate toward the vertical main shaft, a tip portion of the upper inward circular arc-shaped portion is fixed to a fixing portion of an upper blade fixture arranged on the vertical main shaft, and a tip portion of the lower inward circular arc-shaped portion is fixed to a fixing portion of a lower blade fixture arranged on the vertical main shaft. The vertical-shaft wind turbine further includes a support frame body which is framed with horizontal frame bodies horizontally arranged in upper and lower stages and a plurality of support poles, and a generator which is horizontally arranged in each plane central portion surrounded by inner frames respectively provided in the horizontal frame bodies. The upper generator arranged in the upper horizontal frame body has a rotation shaft vertically protruding downward from a lower surface of the upper generator, the lower generator arranged in the lower horizontal frame body has a rotation shaft vertically protruding upward from an upper surface of the lower generator. Upper and lower end surfaces of the vertical main shaft of the vertical shaft rotor are respectively coupled with a lower end surface of the rotation shaft vertically protruding downward from the upper generator and an upper end surface of the rotation shaft protruding upward from the lower generator such that the vertical main shaft of the vertical shaft rotor is concentrically and directly connected between both rotation shafts of the upper and lower generators, and an outer peripheral side of each seam of coupling portions formed by said coupling is sheathed with a covering body to prevent decoupling. Upper and lower end portions of the vertical main shaft of the vertical shaft rotor are respectively coupled and supported between both rotation shafts of the upper and lower generators without using bearings so as to be concentrically and vertically aligned and move cooperatively to reduce torsion and vibration when rotating.

According to the present disclosure, the following effects can be obtained.

According to the disclosure, since the upper and lower end portions of the vertical main shaft of the vertical shaft rotor are respectively and integrally coupled and supported with the rotation shafts vertically facing each other of the upper and lower generators without using bearings to move cooperatively, a rotation force of the vertical main shaft can directly rotate the upper and lower generators to generate electric power.

As a result, it is possible to use small-sized generators, each of which has a small cogging torque. The vertical-shaft wind turbine of the present disclosure is excellent in starting performance at low wind speed and is enhanced in generation efficiency. Moreover, since the upper and lower end portions of the vertical main shaft are respectively and directly coupled and supported with the generators without using bearings, a power generation load is applied to the upper and lower end portions of the vertical main shaft when accelerating. The present disclosure has the effects of reducing torsion, and reducing vibration and noise caused by the vibration.

Furthermore, it is possible to apply regenerative brakes by the generators to the upper and lower end portions of the vertical main shaft respectively and simultaneously, thereby enabling the vertical-shaft wind turbine to be controlled with an excellent balance even in a strong wind.

Still further, it is possible to omit the bearing devices for supporting the vertical main shaft, and therefore it is possible to enhance working properties and reduce cost.

DETAILED DESCRIPTION

An example embodiment according to the present disclosure is described with reference to the drawings as follows.

Figure 1:
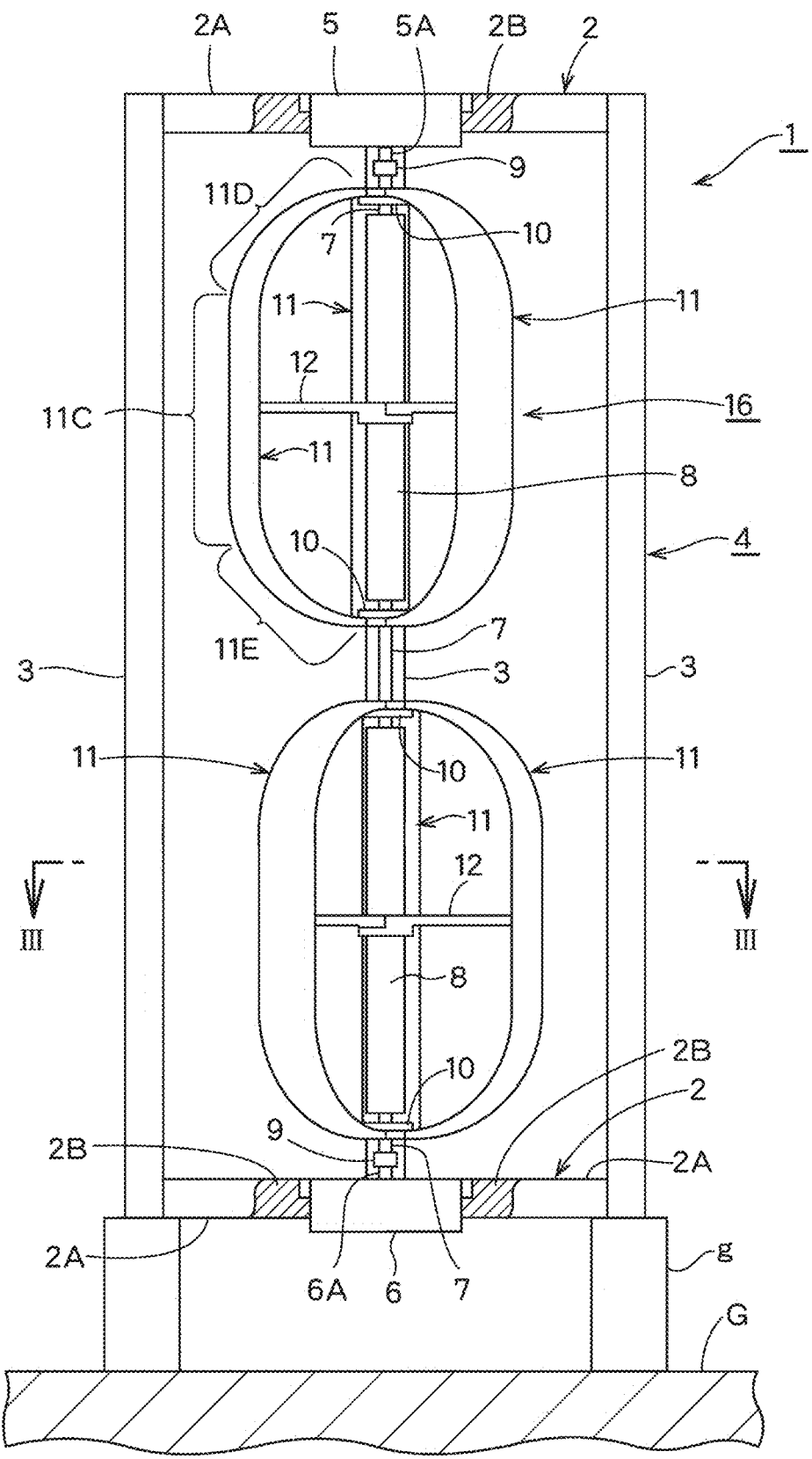
FIG. 1 is a front elevational view showing a vertical-shaft wind turbine of the present disclosure.
Figure 2:
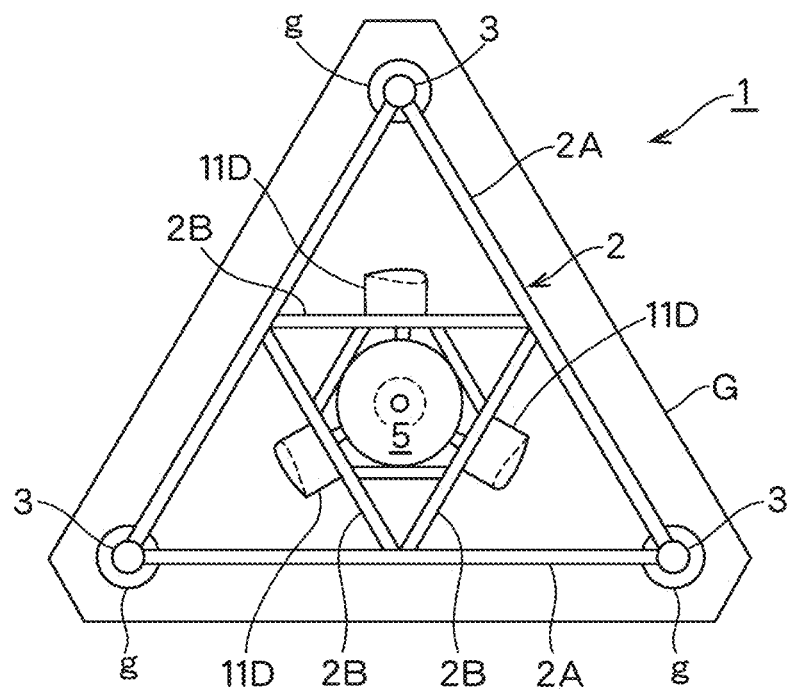
FIG. 2 is a top plan view of the vertical-shaft wind turbine shown in FIG. 1.
Figure 3:
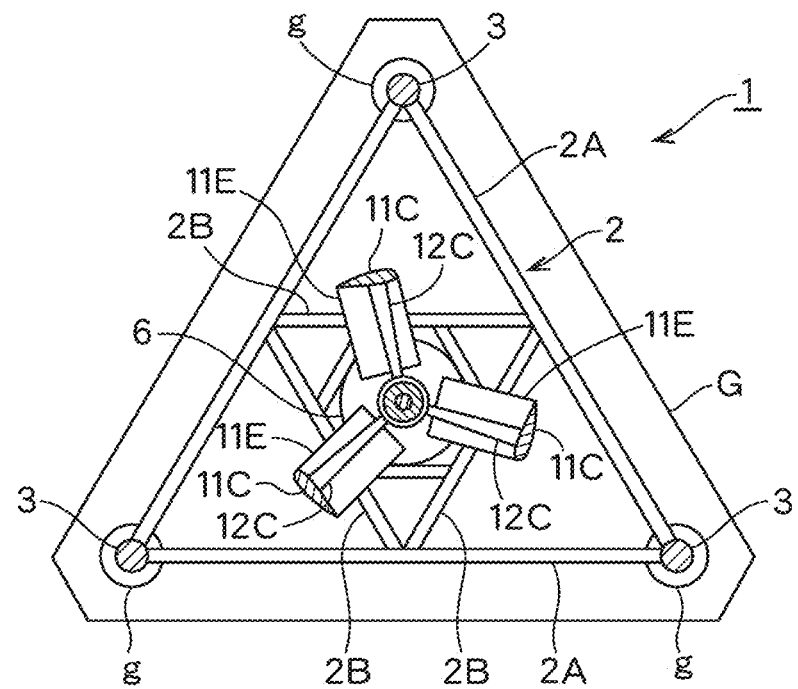
FIG. 3 is a sectional view taken along the line in FIG. 1.

As shown in FIG. 1, a vertical-shaft wind turbine 1 of the present disclosure includes a support frame body 4 that is three-dimensionally formed by upper and lower horizontal frame bodies 2, 2 and a plurality of support poles 3 on a support stand g mounted on a base G, and a vertical shaft rotor 16 supported by the support frame body 4. Although three pieces of the support poles 3 are shown in FIGS. 2, 3, the number of the support poles 3 may be three or four pieces. Although the support poles 3 respectively in a pipe shape are shown in the drawings, the support poles 3 may be respectively a steel material molded in certain shape such as L-shaped steel material, H-shaped steel material, and so on.

As shown in FIG. 2, each of the horizontal frame bodies 2 includes three pieces of outer frames 2A composed in a triangle shape in a plane view, supported with three pieces of the support poles 3 and a plurality of inner frames 2B whereby a generator 5 is horizontally arranged to be in a central portion of the triangle shape. Each of the horizontal frame bodies 2 has the same formation.

Upper and lower end portions of a vertical main shaft 7 of the vertical shaft rotor 16 are respectively and integrally coupled with a lower portion of a downward rotation shaft 5A of the upper generator 5 and an upper portion of an upward rotation shaft 6A of the lower generator 6 to be cooperatively movable by each coupling portion 9 formed thereby. Thus, the vertical main shaft 7 of the vertical shaft rotor 16 is supported without using bearings. Pluralities of lift-type vertical blades 11 are arranged around the vertical main shaft 7.

Figure 4:
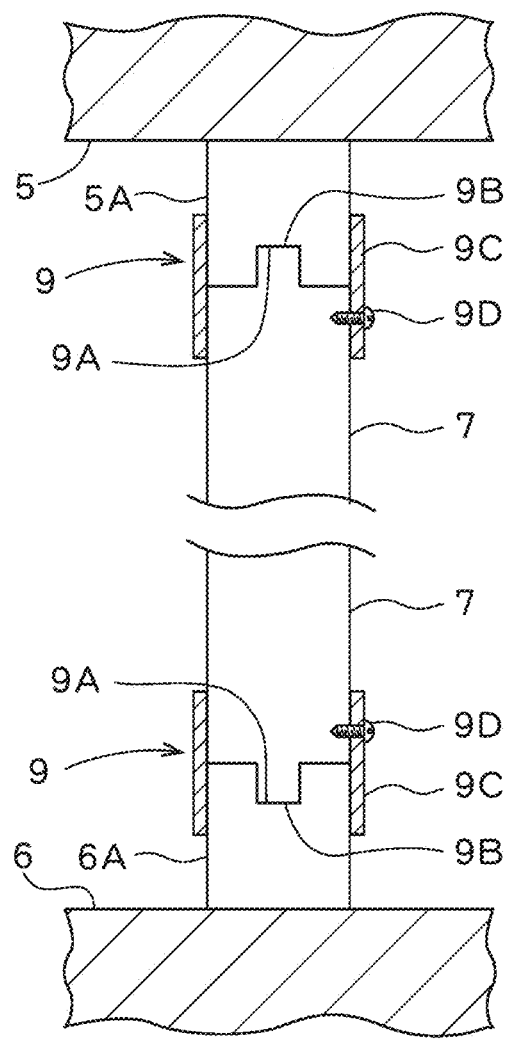
FIG. 4 is a front view showing each coupling state between a rotation shaft of each generator and a vertical main shaft of a vertical shaft rotor shown in FIG. 1.

Each formation of the coupling portions 9 which respectively couples the upper and lower rotation shafts 5A, 6A of the upper and lower generators 5, 6 with the vertical main shaft 7 is exemplified in FIG. 4. A protruding portion 9B of the upper portion of the vertical main shaft 7 is fit to a recessed portion 9A of the lower portion of the downward rotation shaft 5A of the upper generator 5, an outer peripheral side of a seam formed thereby is sheathed with a covering body 9C, and the covering body 9C is fixed to the vertical main shaft 7 by a pin 9D, thereby strengthening the coupling.

Similarly, a protruding portion 9B of the lower portion of the vertical main shaft 7 is fit to a recessed portion 9A of the upward rotation shaft 6A of the lower generator 6, an outer peripheral side of a seam formed thereby is sheathed with another covering body 9C, and the covering body 9C is fixed to the vertical main shaft 7 by another pin 9D, thereby strengthening the coupling. Thus, it is possible to couple the rotation shaft 6A of the generator 6 easily and surely with the vertical main shaft 7.

A universal joint not shown may be applied to each of the coupling portions 9 to enable canceling a narrow gap between the rotation shaft 5A of the generator 5 and the vertical main shaft 7 and a narrow gap between the rotation shaft 6A of the generator 6 and the vertical main shaft 7.

Reinforcing pipes 8 that are made of a thick-elastic-synthetic resin are fit to the vertical main shaft 7 except for proximal portions of the upper and lower generators 5, 6 and the upper and lower blade fixtures 10. Thus, the vertical main shaft 7 made of metal is reduced in a diameter, and it is possible to obtain effects of reducing a weight of the vertical main shaft 7 to increase a rotation efficiency, reducing deflection due to a centrifugal force that is caused when the vertical main shaft 7 rotates at a high speed, reducing vibration due to the deflection, and reducing noise caused by the vibration. The reinforcing pipe 8 is low in load on the rotation because its weight is small.

Two stages of the lift-type vertical blades 11 are fixed to the vertical main shaft 7 to be aligned in upper and lower sides such that the upper and lower blade fixtures 10, 10 are applied to each of the two sets of them. As shown in a top plan view of FIG. 5 and a front view of FIG. 6, the blade fixture 10 has a shaft hole 10C in a central portion and a fitting portion 10D formed on a periphery of the shaft hole 10C on a lower surface. The blade fixture 10 is fixed to the vertical main shaft 7 by fitting a pin into a pin hole 10E formed on a peripheral surface of the fitting portion 10D.

Figure 5:
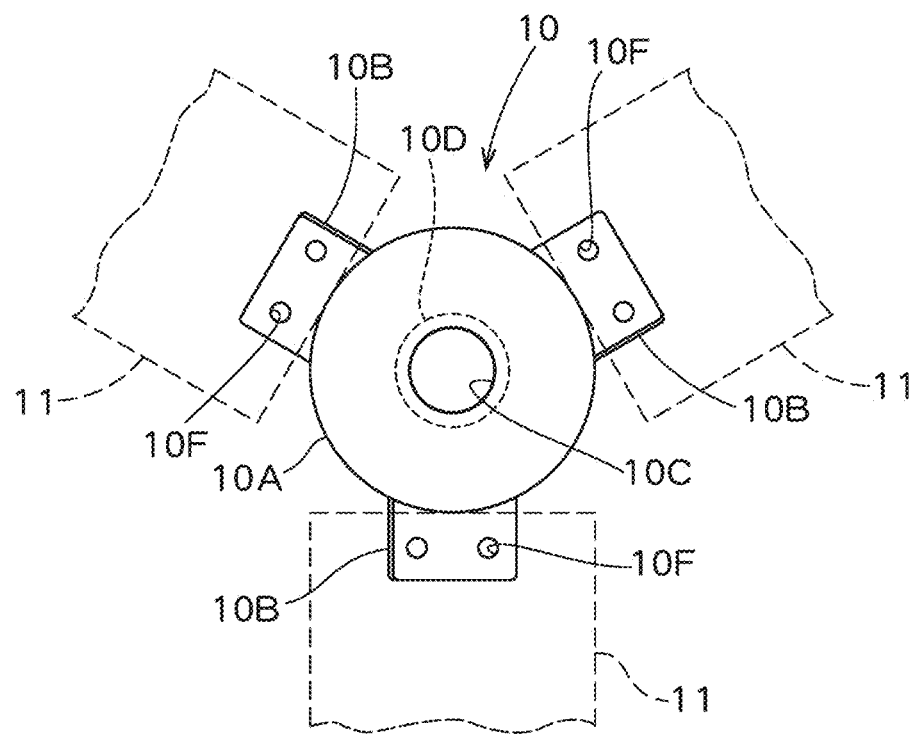
FIG. 5 is a top plan view of a blade fixture shown in FIG. 1.
Figure 6:
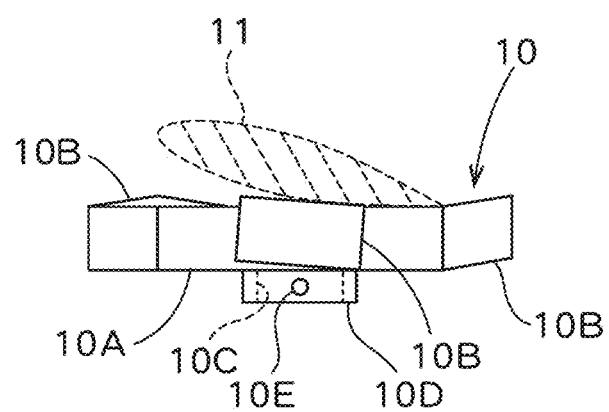
FIG. 6 is a front view of the blade fixture shown in FIG. 5.

As shown in the top plan view of FIG. 5 and the front view of FIG. 6, the blade fixture 10 has a main portion 10A in a disk-like shape and fixing portions 10B formed on a peripheral portion of the main portion 10A to protrude in three directions. The upper and lower end portions of each of the lift-type vertical blades 11 are respectively fixed to the fixing portions in the upper and lower sides by fixing with a screw into each of the screw holes 10F. When using another type of the vertical blade that has an inward inclined portion at the upper and lower end portions respectively, the blade fixture 10, of which the fixing portion 10B is elongated, is used.

As shown in FIG. 1, an inner surface of a vertically middle portion of each of the lift-type vertical blades 11 is supported by a middle support arm 12 that is horizontally fixed on the reinforcing pipe 8 on the vertical main shaft 7.

Figure 7:
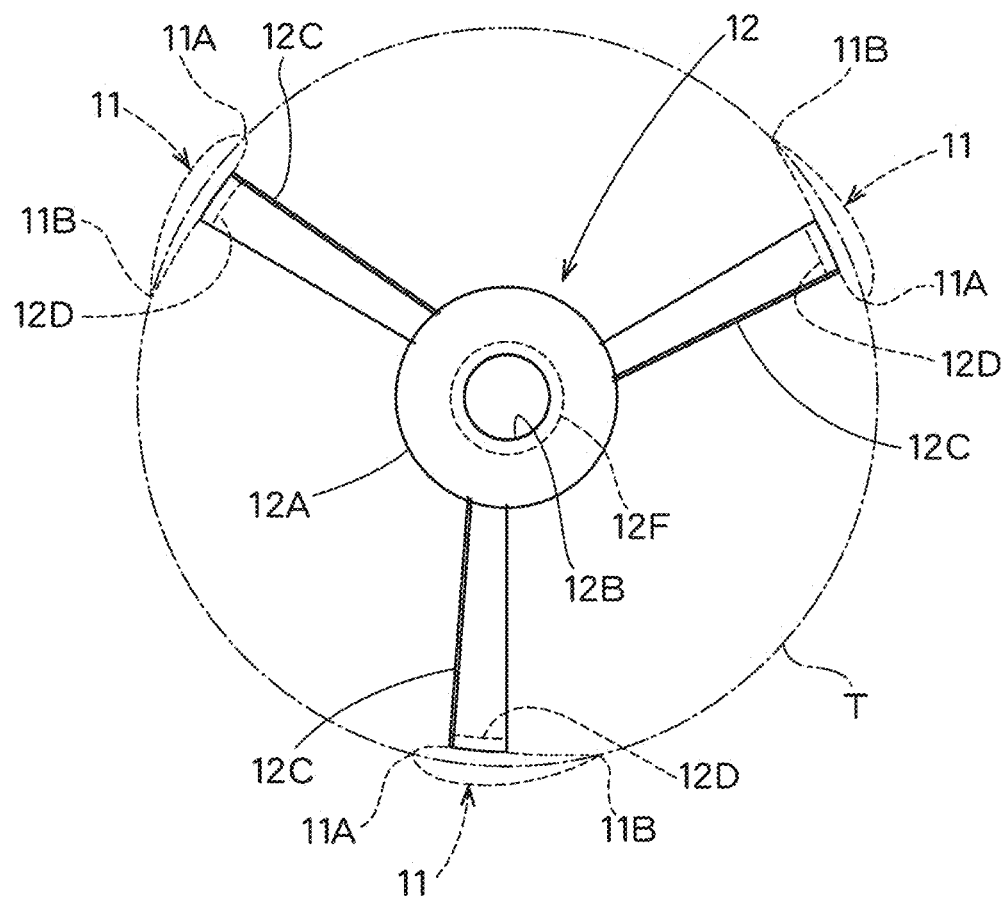
FIG. 7 is a top plan view of a middle support arm shown in FIG. 1.
Figure 8:
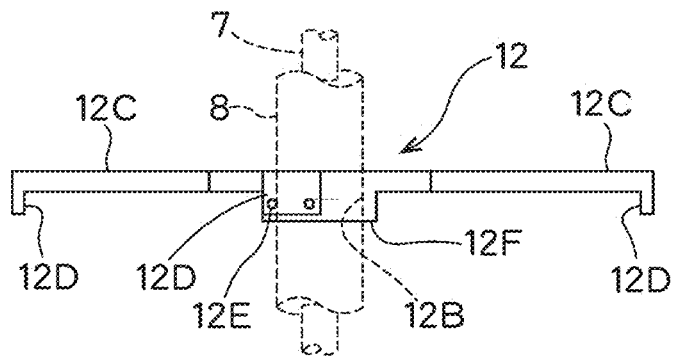
FIG. 8 is a front view of the middle support arm shown in FIG. 7.

As shown in a top plan view of FIG. 7 and a front view of FIG. 8, the middle support arm 12 has a main portion 12A in a disk-like shape, support arm portions 12C horizontally protruded in three directions from a peripheral portion of the main portion 12A, and a downward fixing portion 12D formed at a tip portion of each of the support arm portions 12C. An outer surface of the fixing portion 12D is made to come in contact with an inner surface of the rotating lift-type vertical blade 11 and is fixed with a screw fit into a pin hole 12E.

The middle support arm 12 is fixed to the reinforcing pipe 8 by fitting with a screw into a pin hole (not shown) formed on a fitting portion 12F protruding downward from the main portion 12A. As shown in FIG. 7, a leading edge 11A and a trailing edge 11B of the lift-type vertical blade 11 are set to rotate on the same rotation track T.

As shown in FIG. 7, the lift-type vertical blade 11 is thicker on the outer side than on the inner side with respect to the rotation track T of the blade as a boundary. An air stream passing along an outer surface of the lift-type vertical blade 11 passes through inward in a rear direction from the trailing edge 11B by Coanda effect to push the leading edge 11A of the blade in an outer direction by the reaction.

The configuration of the lift-type vertical blade 11 is not limited. As shown in FIG. 1, an upper inward circular arc-shaped portion 11D is formed from an upper portion of a substantially vertical main portion 11C to elongate in an arc shape toward the vertical main shaft 7, and a lower inward circular arc-shaped portion 11E is formed from a lower portion of the substantially vertical main portion 11C to elongate in an arc shape toward the vertical main shaft 7. Although each length of these three portions 11C, 11D, 11E is set to approximately one-third of the whole length of the blade 11, it is not limited to this configuration.

Figure 9:
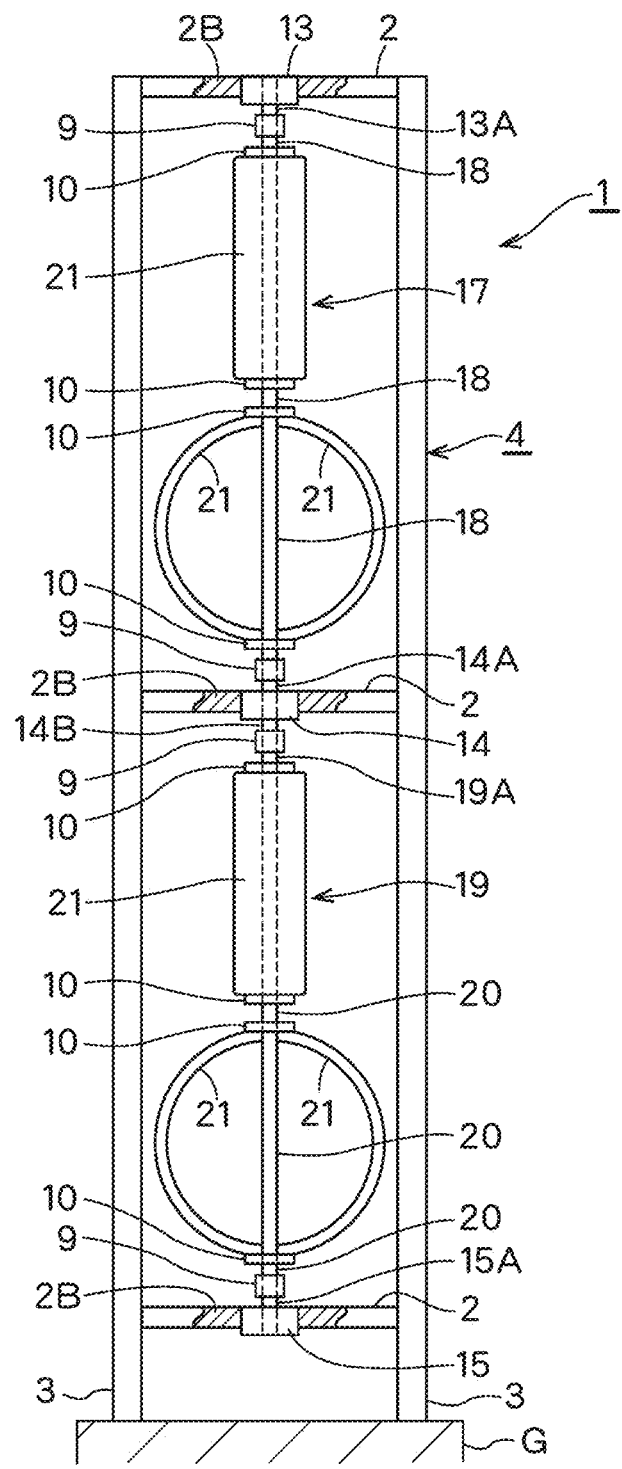
FIG. 9 is a front elevational view showing a vertical-shaft wind turbine of a second embodiment of the present disclosure.
Figure 10:
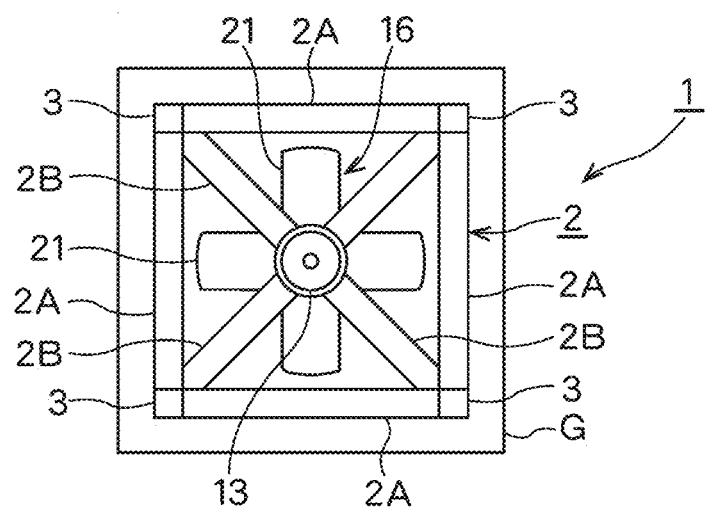
FIG. 10 is a top plan view of the vertical-shaft wind turbine shown in FIG. 9.

FIG. 9 is a front elevational view showing a vertical-shaft wind turbine 1 of a second embodiment of the present disclosure, and FIG. 10 is a top plan view showing the vertical-shaft wind turbine 1. The same parts as those in the former embodiment are attached with the respective same reference signs as those in the former embodiment, and are not explained. In this second embodiment, horizontal frame bodies 2 are respectively arranged in three stages of upper, intermediate, and lower portions of a support frame body 4 such that the height of the support frame body 4 is increased. Upper, intermediate, and lower generators 13, 14, 15 are respectively and horizontally fixed to the horizontal frame bodies 2.

Upper and lower end portions of a vertical main shaft 18 of an upper vertical shaft rotor 17 are respectively and integrally coupled with a downward rotation shaft 13A of the upper generator 13 and an upward rotation shaft 14A of the intermediate generator 14 to be cooperatively movable by each of upper and lower coupling portions 9, 9 formed thereby and are supported without using bearings. The same coupling portions 9 as described according to FIG. 4 can be used as the coupling portions 9 of this embodiment.

Upper and lower end portions of a vertical main shaft 20 of a lower vertical shaft rotor 19 are respectively and integrally coupled with a downward rotation shaft 14B of the intermediate generator 14 and an upward rotation shaft 15A of the lower generator 15 to be cooperatively movable by each of upper and lower coupling portions 9, 9 formed thereby and are supported without using bearings. Incidentally, the same reinforcing pipes 8, as described according to FIG. 1, can be fit to the upper and lower vertical main shafts 18, 20 respectively.

The upper vertical shaft rotor 17 is formed such that two sets of lift-type vertical blades 21, 21 are fixed to the upper vertical main shaft 18 to be aligned in upper and lower stages and a phase of the upper lift-type vertical blades 21 is shifted from that of the lower lift-type vertical blades 21 to be equiangularly apart. The configuration of the lift-type vertical blades 21 is optional. Although the two-vanes type, vertical shaft rotor 17 having the semicircular arc-shaped, lift-type vertical blades 21 in the front elevational view are shown in the drawings, the vertical shaft rotor 17 can be formed in a type of more than three vanes.

The lower vertical shaft rotor 19 is formed such that two sets of lift-type vertical blades 21, 21 are fixed to the lower vertical main shaft 20 to be aligned in upper and lower sides and a phase of the upper lift-type vertical blades 21 is shifted from that of the lower lift-type vertical blades 21 to be equiangularly apart.

In this manner, the horizontal frame bodies 2 are respectively arranged in the three stages of the upper, intermediate, and lower portions of the support frame body 4, the generators 13, 14, 15 are respectively arranged on the horizontal frame bodies 2, the vertical main shaft 18 of the upper vertical shaft rotor 17 is integrally connected between the downward rotation shaft 13A of the upper generator 13 and the upward rotation shaft 14A of the intermediate generator 14 to be supported without using bearings, and the vertical main shaft 20 of the lower vertical shaft rotor 19 is integrally connected between the downward rotation shaft 14B of the intermediate generator 14 and the upward rotation shaft 15A of the lower generator 15 to be supported without using bearings. Therefore, since the upper and lower end portions of each of the vertical main shafts 18, 20 of the respective vertical shaft rotors 17, 19 which are different in height, are respectively fixed between the rotation shafts of the generators facing each other, it is possible to obtain a vibration free effect and an effect of reducing noise caused by the vibration.

Moreover, it is possible to use small-sized generators, thereby improving starting performance even at low wind speed to enhance the rotation efficiency. When it is in a strong wind state, the upper, intermediate, and lower generators 13, 14, 15 can be respectively used as regenerative brakes. Therefore, it is possible to obtain an effect of stable and secure controlling.

Incidentally, regarding the vertical-shaft wind turbine shown in FIG. 9, the vertical shaft rotors can be arranged in three stages by arranging the horizontal frame bodies 2 in four stages in the support frame body 4 and the generators are respectively arranged on the horizontal frame bodies 2. In such a case, the number of vertical blades of each of the vertical shaft rotors may be not only two pieces as shown in the drawings but also one piece or three pieces.

As described in detail, since the upper and lower portions of the vertical main shaft of the vertical shaft rotor are respectively and integrally coupled with the rotation shafts of the respective upper and lower generators to be directly supported without using bearings, the present disclosure has the effects of reducing torsion of the vertical main shaft when rotating, reducing vibration due to the torsion, and reducing noise caused by the vibration. Moreover, since it is possible to use small-sized generators each of which has a small cogging torque, the vertical-shaft wind turbine of the present disclosure is excellent in starting performance at low wind speed, is enhanced in rotation efficiency, and can be widely utilized as a wind-power generation device used in an urban area and so forth.

Since the generators are respectively arranged in the upper and lower horizontal frame bodies of the support frame body of the vertical-shaft wind turbine, and the vertical main shaft of the vertical shaft rotor is integrally connected between the rotation shafts of the respective upper and lower generators, the vertical-shaft wind turbine of the present disclosure enhances starting performance by using small-sized generators, enhances rotation efficiency, and can be widely utilized as a wind-power generation device used in an urban area and so forth.

What is claimed is:

1. A vertical-shaft wind turbine comprising:
   a plurality of lift-type vertical blades arranged at fixed intervals around a vertical main shaft of a vertical shaft rotor, wherein each of the plurality of lift-type vertical blades has a substantially vertical main portion and upper and lower inward circular arc-shaped portions that are respectively and continuously formed from a top and a bottom of the substantially vertical main portion to respectively elongate toward the vertical main shaft, a tip portion of the upper inward circular arc-shaped portion is fixed to a fixing portion of an upper blade fixture arranged on the vertical main shaft, and a tip portion of the lower inward circular arc-shaped portion is fixed to a fixing portion of a lower blade fixture arranged on the vertical main shaft;
   wherein the vertical-shaft wind turbine further comprises a support frame body which is framed with horizontal frame bodies horizontally arranged in upper and lower stages and a plurality of support poles, and a generator which is horizontally arranged in each plane central portion surrounded by inner frames respectively provided in the horizontal frame bodies, wherein an upper generator arranged in the upper horizontal frame body has a rotation shaft vertically protruding downward from a lower surface of the upper generator, a lower generator arranged in the lower horizontal frame body has a rotation shaft vertically protruding upward from an upper surface of the lower generator, upper and lower end portions of the vertical main shaft of the vertical shaft rotor are respectively coupled with a lower end portion of the rotation shaft vertically protruding downward from the upper generator and an upper end portion of the rotation shaft protruding upward from the lower generator thereby forming a seam between the vertical main shaft and the respective rotation shafts of the upper and lower generators, such that the vertical main shaft of the vertical shaft rotor is concentrically and directly connected between both rotation shafts of the upper and lower generators, and wherein an outer peripheral side of the seam between the vertical main shaft and the respective rotation shafts of the upper and lower generators is sheathed with a covering body for preventing decoupling; and wherein upper and lower end portions of the vertical main shaft of the vertical shaft rotor are respectively coupled and supported between both rotation shafts of the upper and lower generators without using bearings so as to be concentrically and vertically aligned and move cooperatively to reduce torsion and vibration when rotating.

2. The vertical-shaft wind turbine according to claim 1, wherein the horizontal frame bodies of the support frame body are arranged in upper, intermediate, and lower stages, an upper vertical shaft rotor is arranged between the upper horizontal frame body and an intermediate horizontal frame body, a lower vertical shaft rotor is arranged between the intermediate horizontal frame body and the lower horizontal frame body, and the generator is horizontally arranged in each of the plane central portions respectively surrounded by the inner frames respectively provided in the horizontal frame bodies;

wherein the upper generator arranged in the upper horizontal frame body has the rotation shaft vertically protruding downward from the lower surface of the upper generator, the intermediate generator arranged in the intermediate horizontal frame body has a rotation shaft vertically protruding upward and downward respectively from an upper surface and a lower surface of the intermediate generator, the lower generator arranged in the lower horizontal frame body has the rotation shaft vertically protruding upward from the upper surface of the lower generator;

wherein upper and lower end portions of the vertical main shaft of the upper vertical shaft rotor are respectively coupled with the lower end portion of the rotation shaft vertically protruding downward from the upper generator and an upper end portion of the rotation shaft protruding upward from the intermediate generator such that the vertical main shaft of the upper vertical shaft rotor is concentrically and directly connected between the both rotation shafts of the upper and intermediate generators, and an outer peripheral side of a seam between the vertical main shaft and the respective rotation shafts of the upper and intermediate generators is sheathed with a corresponding covering body for preventing decoupling, thereby supporting the vertical main shaft of the upper vertical shaft rotor between the both rotation shafts of the upper and intermediate generators without using bearings;

wherein upper and lower end portions of the vertical main shaft of the lower vertical shaft rotor are respectively coupled with the lower end portion of the rotation shaft vertically protruding downward from the intermediate generator and the upper end portion of the rotation shaft protruding upward from the lower generator such that the vertical main shaft of the lower vertical shaft rotor is concentrically and directly connected between both rotation shafts of the intermediate and lower generators, and an outer peripheral side of a seam between the vertical main shaft and the respective rotation shafts of the intermediate and lower generators is sheathed with a corresponding covering body for preventing decoupling, thereby supporting the vertical main shaft of the lower vertical shaft rotor between the both rotation shafts of the intermediate and lower generators without using bearings; and wherein the rotation shaft of the upper generator, the vertical main shaft of the upper vertical shaft rotor, the rotation shaft of the intermediate generator, the vertical main shaft of the lower vertical shaft rotor, and the rotation shaft of the lower generator are connected and supported to be concentrically and vertically aligned and to be cooperatively movable.

3. The vertical-shaft wind turbine according to claim 2, wherein the lower end portion of the rotation shaft of the upper generator includes a transverse recessed portion which is recessed in a shaft direction and elongates in a transverse direction;

wherein the upper and lower end portions of the rotation shaft of the intermediate generator respectively include a transverse recessed portion which is recessed in a shaft direction and elongates in a transverse direction;

wherein the upper end portion of the rotation shaft of the lower generator includes a transverse recessed portion which is recessed in a shaft direction and elongates in a transverse direction, wherein the upper and lower end portions of the vertical main shaft of the upper vertical shaft rotor respectively include a transverse protruding portion which projects in the shaft direction and elongates in a transverse direction;

wherein the upper and lower end portions of the vertical main shaft of the lower vertical shaft rotor respectively include a transverse protruding portion which projects in a shaft direction and elongates in a transverse direction;

wherein the transverse protruding portions respectively formed on the upper and lower end portions of the vertical main shaft of the upper vertical shaft rotor are respectively fit to the transverse recessed portion on the lower end portion of the rotation shaft of the upper generator and the transverse recessed portion on the upper end portion of the rotation shaft of the intermediate generator such that the vertical main shaft of the upper vertical shaft rotor is concentrically and directly connected between both rotation shafts of the upper and intermediate generators, and an outer peripheral side of a seam between the vertical main shaft and the respective rotation shafts of the upper and intermediate generators is sheathed with a corresponding covering body for preventing decoupling; and wherein the transverse protruding portions respectively formed on the upper and lower end portions of the vertical main shaft of the lower vertical shaft rotor are respectively fit to the transverse recessed portion on the lower end portion of the rotation shaft of the intermediate generator and the transverse recessed portion on the upper end portion of the rotation shaft of the lower generator such that the vertical main shaft of the lower vertical shaft rotor is concentrically and directly connected between both rotation shafts of the intermediate and lower generators, and an outer peripheral side of a seam between the vertical main shaft and the respective rotation shafts of the intermediate and lower generators is sheathed with a corresponding covering body for preventing decoupling.

4. The vertical-shaft wind turbine according to claim 1, wherein the lower end portion of the rotation shaft of the upper generator and the upper end portion of the rotation shaft of the lower generator include respectively a transverse recessed portion which is recessed in a shaft direction and elongated in a transverse direction, and the upper and lower end portions of the vertical main shaft of the vertical shaft rotor include respectively a transverse protruding portion which is projected in the shaft direction and elongated in a transverse direction; and wherein the transverse protruding portions formed respectively on the upper and lower end portions of the vertical main shaft of the vertical shaft rotor are respectively fit to the transverse recessed portion on the lower end portion of the rotation shaft of the upper generator and the transverse recessed portion on the upper end portion of the rotation shaft of the lower generator such that the vertical main shaft of the vertical shaft rotor is concentrically and directly connected between both rotation shafts of the upper and lower generators, and the outer peripheral side of the seam between the vertical main shaft and the respective rotation shafts of the upper and lower generators is sheathed with the covering body for preventing decoupling.

* * * * *